March 1, 1966  J. F. KLOSKI  3,237,287
METHOD FOR PRODUCING GEARS
Filed Jan. 30, 1962
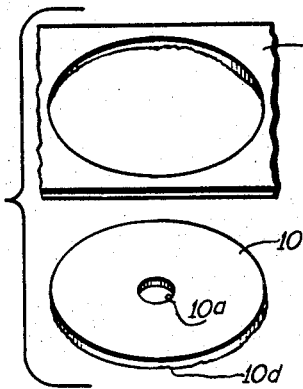
Fig_1
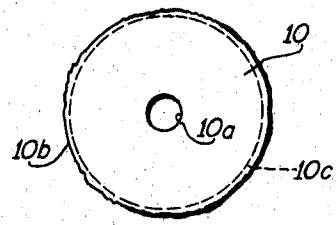
Fig_2
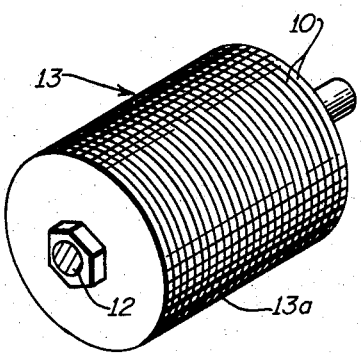
Fig_3
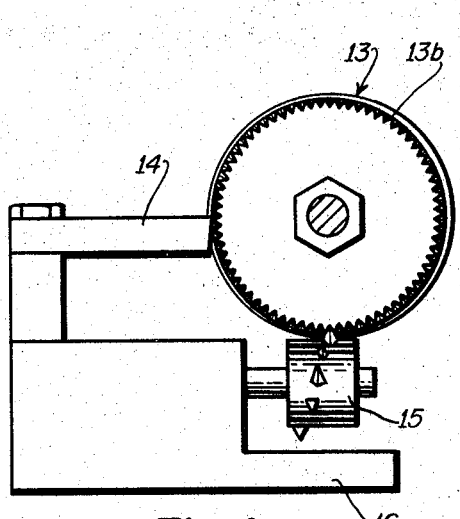
Fig_4
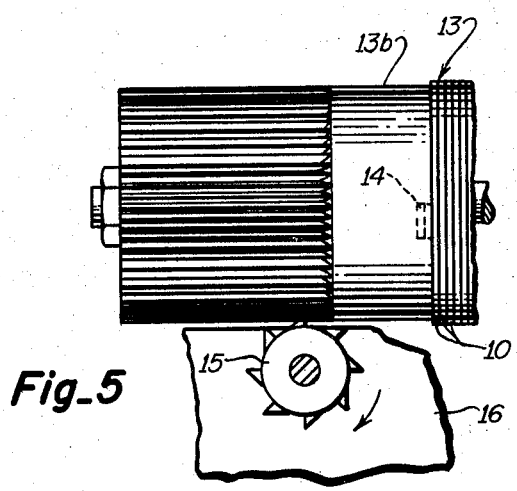
Fig_5
INVENTOR
JOHN F. KLOSKI
Thomas S. Ross
BY James R. Black
ATTORNEYS

United States Patent Office 3,237,287
Patented Mar. 1, 1966

3,237,287
METHOD FOR PRODUCING GEARS
John F. Kloski, West Hartford, Conn., assignor, by mesne assignments, to Royal Typewriter Company, Inc., New York, N.Y., a corporation of Delaware
Filed Jan. 30, 1962, Ser. No. 169,759
2 Claims. (Cl. 29—159.2)

This invention relates to a method for producing gears, ratchet wheels and the like.

In accordance with one long used method of manufacturing gears, ratchet wheels and the like, blanks are first stamped from sheet metal of suitable gauge. A number of these blanks are then stacked on an arbor to form a relatively long cylindrical work piece assembly which is rotatably mounted in any suitable mill and hobbed by a rotating hobbing cutter to form teeth in the individual blanks. The stamped blanks, however, present certain difficulties to the most efficient and economic use of the hob. When the blanks are stamped from relatively heavy gauge sheet metal, for example, of the order of 3/32", they are not uniformly concentric. Indeed I have found that the range of eccentricity of twenty-five blanks selected at random will be from .003" to .0065 or more. More importantly, the metal at the rim of the blank is subjected to such great stress as in effect to increase the molecular density of the metal thus imparting to the rim portion of the blank a hardness considerably greater than that of the sheet from which the blank was stamped. Accordingly, the cylindrical work piece assembly of blanks is, in effect, case hardened, having a tough skin of substantial radial thickness that is not only difficult to machine but also rapidly dulls the cutting edges of the hob. These hobs are quite costly and can be resharpened but a few times before their usefulness comes to an end. Also because of the toughness of the work piece skin low tool feed rates and rotational speeds must be used to prevent rapid deterioration or irreparable damage to the hob. Thus low production and high cost of the gears or ratchets is the result.

It is, acordingly, an object of the invention to provide a method for making gears, ratchets and the like which overcomes the above-mentioned difficulties as well as others in a highly effective and economical manner. Other objects will be in part apparent and in part pointed out hereinafter.

In the drawing wherein I show the steps comprising one manner of practicing my method and one form of apparatus that may be used:

FIGURE 1 is a perspective view illustrative of the initial operation of stamping a gear blank from a strip of sheet metal;

FIGURE 2 is a top plan view of a gear blank;

FIGURE 3 is a perspective view of a cylindrical work piece assembly of blanks after they have been stacked on an arbor;

FIGURE 4 is an end elevation of a portion of a preferred form of machine practicing the final step of my method; and FIGURE 5 is a side elevation of the machine portion shown in FIGURE 4.

In the manufacture of gears or ratchets in accordance with my method, I first form gear blanks by stamping them from a strip of sheet metal by a suitable punch press. As indicated in FIGURE 1 a blank 10 is stamped from metal strip 11 so that the blank has a bore 10a and a rim 10b (FIGURE 2). This operation results in blanks 10 that are not of uniform concentricity, their eccentricity ranging from .003" out of round to .0065" or sometimes more. As the blanks are punched out, the metal is subjected to very substantial shearing stress at the edge of the bore and at the rim of the blank which results in regions 10c of substantial radial depth of much greater hardness than that of the rest of the blank. I have found the hardness of the skin region 10c to be of the order of HV343, compared to a hardness of HV170 for the rest of the blank, one peripheral edge 10d of the rim also being characterized by a large number of burrs of equal hardness. These three factors, namely, eccentricity, hardness and burring contribute greatly to wear of and damage to the hob when the blanks are milled immediately after stamping.

Next, in accordance with the practice of my method, I stack a number of blanks 10, illustratively twenty-five, on an arbor 12 (FIGURE 3) whereon they are clamped in as close proximity as possible in any suitable manner. The blanks, so stacked, constitute an elongated cylindrical work piece assembly, generally indicated at 13, the surface 13a of which is irregular or rough by reason of the varying eccentricity of the blanks as noted above. In other words work piece surface 13a is characterized by a number of circular, sharp-edged, burred shoulders into which the cutting teeth of the hob would normally bite. It is apparent that this condition with the attendant hardness and burring referred to combine to create a rather formidable obstacle to the cutting action of the hob.

After the blanks 10 have been stacked on arbor 12, the work piece 13 may be mounted in the usual manner on a gear hobber such as the well known Barber-Colman, for example, equipped with a conventional progressively toothed hob 15 (FIGURE 4).

The final step in the performance of my method is a combination operation. With work piece 13 rotating it is given a surface or turning cut, as by a turning tool 14 (FIGURES 4 and 5) which accomplishes three purposes simultaneously; first it reduces eccentricity of the gear to a value of .003" or less; second it removes the hard skin referred to; third it removes the burrs on the blanks. Thus the work piece is reduced in diameter as at 13b to substantially the desired diameter of the gear being produced and its surface is rendered concentric, burr-less and substantially smooth.

The other portion of the combination operation referred to comprises the actual hobbing cut of the work piece by a hob 15 to form the gear teeth. This cut immediately follows the turning cut without halting rotation of the work piece as both tool 14 and hob 15 are mounted on a conventional tool stock 16. By reason of the preceding turning cut a clean, smooth, relatively soft metal surface of the work piece is constantly presented to the hob enabling it to accomplish its purpose without having, by itself, to overcome the obstacles of eccentricity, hardness and burrs.

Through the practice of my method I have found that not only can more and better gears be produced per unit of time than with prior methods but also the useful life of the hob is increased approximately 28 percent. Production is increased because both the work and the hob can be rotated at higher speeds and the feed rate of the hob can be increased as it does not have to remove as much metal as formerly.

It may now be seen that I provided a method of and apparatus for producing gears and the like that attains the objects set forth above in a thoroughly practical and efficient manner.

What is claimed is:

1. The herein described art which includes the steps of forming a plurality of thin circular metallic gear blanks, mounting and clamping said blanks on an arbor in close coaxial adjacency to form a discrete cylindrical work piece, rotating said arbor and accordingly said work piece, removing the peripheral scale and burrs from said rotating work piece formed by the said forming operation, and simultaneously hobbing said work piece while its scale and burrs are being removed but at a point axially spaced from the point of removal and rearwardly thereof with respect to the direction of machining feed.

2. A method for manufacturing gears from gear blanks comprising the steps of forming a plurality of circular metal gear blanks, clamping said blanks together in coaxial alignment to form a cylindrical work piece, turning said work piece while rotating it to remove the peripheral scale and reduce any eccentricity formed by said forming process, and simultaneously hobbing said work piece while said work piece is being turned but at a point axially spaced and rearwardly of the portion of the work piece being turned.

References Cited by the Examiner

UNITED STATES PATENTS

| | | | |
|---|---|---|---|
| 914,700 | 3/1909 | Christensen | 29—159.2 |
| 1,173,433 | 2/1916 | Johnston | 29—159.2 |
| 1,729,300 | 9/1929 | Terbush | 29—159.2 |
| 2,195,097 | 3/1940 | Scott | 90—4 |
| 2,211,611 | 8/1940 | Staples | 90—4 |
| 2,924,151 | 2/1960 | Ufert | 90—4 |
| 2,996,958 | 8/1961 | Mente | 90—4 |

WHITMORE A. WILTZ, *Primary Examiner.*

LEON PEAR, THOMAS H. EAGER, *Examiners.*

L. B. TAYLOR, *Assistant Examiner.*